United States Patent [19]

Kardell

[11] 4,057,165
[45] Nov. 8, 1977

[54] REUSABLE FOLDING CONTAINER

[76] Inventor: Kurt J. Kardell, 115 Industrial Drive, Tempe, Ariz. 85281

[21] Appl. No.: 789,361

[22] Filed: Apr. 21, 1977

[51] Int. Cl.² .......................... B65D 7/24; B65D 5/20
[52] U.S. Cl. ........................................ 220/6; 16/150; 16/DIG. 13; 220/7; 220/339
[58] Field of Search ................ 220/6, 7, 339; 229/30; 16/150, DIG. 13

[56] References Cited

U.S. PATENT DOCUMENTS

| 3,254,786 | 6/1966 | Melville | 220/6 |
| 3,376,994 | 4/1968 | Flinn | 220/6 |
| 3,497,127 | 2/1970 | Box | 220/6 |
| 3,796,342 | 3/1974 | Sanders | 220/6 |
| 3,870,185 | 3/1975 | Sanders | 220/6 |
| 3,874,546 | 4/1974 | Sanders | 220/6 |
| 3,955,703 | 3/1976 | Zebarth | 220/6 |

FOREIGN PATENT DOCUMENTS

| 1,298,673 | 12/1972 | United Kingdom | 220/7 |

Primary Examiner—George E. Lowrance
Attorney, Agent, or Firm—Warren F. B. Lindsley

[57] ABSTRACT

A reusable container which when unfolded and assembled may be used to store and ship products and provided with means for compactly re-folding or disassembling for return to source of origin and subsequently reused.

11 Claims, 20 Drawing Figures

FIG. 16 is a cross-sectional view of FIG. 14 taken along the line 16—16;

FIGS. 17 and 18 are perspective views of still further modifications of the hinge structure shown in FIGS. 1–16;

FIG. 19 is an enlarged partial view of the hinge structure shown in FIGS. 17 and 18 in a pivoted position; and FIG. 20 is a still further modification of the hinge structure shown in FIGS. 17–19 wherein the hinge is formed integral with the full width of the side of the container.

DESCRIPTION OF THE PREFERRED EMBODIMENT

Referring more particularly to the drawings by characters of reference, FIG. 1 illustrates a completely assembled, reusable, folding container 10 without its cover which may, for example, comprise a pallet-type base portion 11, the flat top outer edge surface of which supports side panels A and B and end panels C and D which are mounted in hinged relationship by means of hinges 12.

The panels A, B, C, and D may be interconnected and maintained in vertical upright relationship on the pallet-type base 11 by vertically extending tongue and groove arrangements 13 shown more clearly in FIG. 5 that are provided at each of the so-formed corners of the container.

As previously stated, the disclosed reusable, folding pallet container 10 is primarily intended for use in storing, transporting, and shipping various kinds of products in packaged form. After such usage, the container is returned in its collapsed form to its source of origin at which point, if so desired or required, it may be completely dismantled for thorough cleaning and sterilization before reassembly and reuse.

To provide such a container, it should be evident that the design, fabrication and material requirements for construction assume importance. Although metal, particle board, plywood or the like could be used in their construction, such materials have many inherent disadvantages, among which is their excessive weight, necessity for using additional, independent parts and operations in their fabrication, assembly and handling especially if they are to be easily folded into a compact form for return shipment.

Therefore, the preferable materials found to be satisfactory for inexpensive construction and utilization of the containers are the high-impact strength plastics or fiberglass. Such materials have the necessary characteristics of malleability and flexibility to allow for the forming of the flat, smooth-sided panels A, B, C and D together with their respective integral hinge elements 12 and the vertically disposed elements of the tongue and groove locking arrangement or means 13 at the intersecting side edges of the respective panels. The pallet-type base portion 11 of the container, with its integral portion of the hinge element 12 and its integral longitudinally disposed skid portions 14 may be formed as a single piece to thereby economize the construction cost of the container.

The hinge element 12, as shown in FIGS. 1–4, comprises an elongated strip 15 of resilient material such as a suitable plastic which is provided with a plurality of spaced slots 16 along its length which may each open up into apertures 17 internally of the strip to provide a plurality of bending zones one at each of the slots 16.

As shown in FIGS. 1–4, each of the strips may comprises an element separate from the side and end panels A, B, C and D and the skid portion 14 of the container 10 with one of the ends of the strip being formed with a hook-like member or catch 19 for engaging within an interlocking manner a protrusion 20 formed in a slot 21 in the top surface of the base portion 11 of the container 10.

To interlock the hook-shaped catch with protrusion 20 of the base portion 11, the catch 19 of the strip 15 is inserted in the base portion 11 in the manner shown in FIG. 3.

The other end of strip 15 is provided with a slot 22 and flange 23 with slot 22 opening in the same direction as slots 16, as shown in FIGS. 2 and 4. Flange 23 is arranged for entering into an aperture 24 in the bases of panels A, B, C and D to lie juxtapositioned thereto, as shown in FIG. 2.

FIG. 6 discloses a lid or cover 25 for the open end of container 10. This cover may be hingedly attached by hinge means 26 on the top edge of one of the panels such as panel A, if so desired. This hinge means comprises a strip of material 27 which is grooved at 28 in the manner shown for strip 15 of FIGS. 2-4 so as to be bendable around the strip at any one of the grooves 28. The strip of material 27 is provided with a catch 29 at one end for extending through an aperture 30 in the cover and overlapping a part of its periphery while flange 31 at its other end extends through an aperture 32 in panel A and arranged to extend juxtapositioned thereto for hinging the cover to this panel.

The reusable, folding pallet container of the present invention indicated generally by the reference character 10 may be easily and quickly assembled, folded or completely dismantled by the action of one person in performing the following simple steps or operations in the proper sequence:

The side panel A is first connected to the base portion 11 in pivoted relationship thereto by placing catch 19 in aperture 21 and then placing flange 23 through aperture 22 of panel A as previously described.

The side panel B is next connected to base 11 in pivoted relationship by completing the assembly of its hinge 12 in the same manner as described above. The end panels C and D are next connected to base 11 in pivoted relationship by completing the assembly of its hinge 12 in a like manner.

Panels A and B are then held in upright perpendicular relationship to base portion 11 and the end panel C is raised into a like position with base portion 11 and locked securely to the side panels A and B by means of their respective tongue and groove connecting means 13. This association being readily accomplished by causing a slight deflection of flanges 33 at the outer edges of end panel C.

End panel D is then connected to base portion 11 in pivoted relationship by first completing the assembly of its hinge 12 and then it is raised and securely locked to the ends of panels A and B by means of their tongue and groove connecting means 13 to form a completely assembled pallet container 10.

After use, the assembled empty container may readily be folded into a compact form with each of its panel components superimposed in a proper sequence on the flat top surface of base portion 11 and on the exposed top surface of each other, as shown in FIG. 10, by simply following the sequence of this operation as illustrated in FIGS. 7, 8 and 9 of the drawings.

REUSABLE FOLDING CONTAINER

BACKGROUND OF THE INVENTION

This invention pertains to sturdy collapsible containers that are box-like in form having integral pallet-type bases for use in handling by lift trucks. Such containers have been utilized for storing, transporting and shipping various products and materials in bulk or packaged form from their source of origin to final destination and returned to the point of origin.

DESCRIPTION OF THE PRIOR ART

Some of the known containers employ spring-type clamping members at their corners to hold plywood panels together in assembled relationship which require time and effort to remove before the container may be collapsed and made ready for return shipment to its source of origin. Equal time again is required for their reinstallation when assemblying the container for reuse.

Another problem inherent with the use of separate spring clips or other similar means in the assembly or disassembly of containers for return shipment and resuse is the effort needed to keep available spring clips and other loose structural members which are easily lost, stolen, mislaid or damaged during handling resulting in considerable additional expense to the users.

A further disadvantage of the prior art collapsible containers is the fact that their structural panels are usually fabricated of exterior grade plywood which is heavy, expensive and may be damaged by moisture present on the inside or outside of the same. This condition could result from natural causes, such as rain or leakage of liquid from damaged stored cans and bottles or the thawing of frozen food cartons carried therein. To avoid such an undesirble condition, it is necessary that such plywood construction panels be coated, at least on their inside surfaces, with a material impervious to most liquids, thus resulting in additional expense.

U.S. Pat. No. 3,414,156 discloses a collapsible container for fluid or powder, but the panels do not fold down one on top of the other, as claimed in this application.

U.S. Pat. No. 2,760,669 discloses a folding lunch box having hinges only along the front part thereof, which is clearly different from that claimed herein.

U.S. Pat. No. 2,735,568 merely discloses a collapsible wall pallet.

Many other forms of non-collapsible containers, such as built-up wooden boxes, steel drums and the like, have been utilized for storing and transporting solids, liquid and other packaged or bulk materials, but their use for this purpose is neither very practical or economical because such containers are usually destroyed or allowed to accumulate at their destination, creating a costly disposal problem or an ecological blight.

SUMMARY OF THE INVENTION

In accordance with the present invention, a new and improved, reusable, folding pallet-mounted container is provided which is simple in construction, inexpensive to fabricate, easy to move about and stack when empty or fully loaded, by a lift truck and which is capable of quickly being folded into a compact form for purposes of space conservation for returning to its source or origin and again quickly set up again for reuse. The use of such containers reduces the handling cost of various products that may be shipped or stored therein.

Therefore, one object of this invention is to provide an improved container which may be utilized for storing, transporting or shipping various products and when empty may be easily and quickly folded upon itself into a compact form for inexpensive return shipment and subsequent reassembly and reuse.

Another object of this invention is to provide an improved foldable, reusable shipping container that utilizes a pallet-type base having integral hinge elements on its upper, flat edge surfaces adaptable for receiving mating hinge elements integrally formed on the bottom inside surfaces of the enclosures forming wall panels.

A still further object of this invention is to provide an improved foldable, reusable shipping container having tongue and groove means adjacent its side edges for locking the panels in temporary erected relationship at the corners of the container.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings, in which:

As shown in FIG. 7, side panel A is first disconnected from its tongue and groove locking means 13 with the end panels C and D and radially pivoted inwardly about the groove 16A, shown in FIG. 2, providing the thickness of panel A is substantially equal to the distance of the top surface of the base portion from groove 16A (in the direction of the arrow 1), until its flat inside face rests upon the flat top surface of the pallet base portion 11 shown in FIG. 8. The detachment from its tongue and groove locking means 16 with the end panels C and D is now repeated for the other side panel B and it is pivoted inwardly about groove 16B of its hinge 12 in the direction of the arrow 2) until its flat inside face rests upon the flat top folded surface of panel A, as illustrated in FIG. 9 of the drawings.

Figure 1:
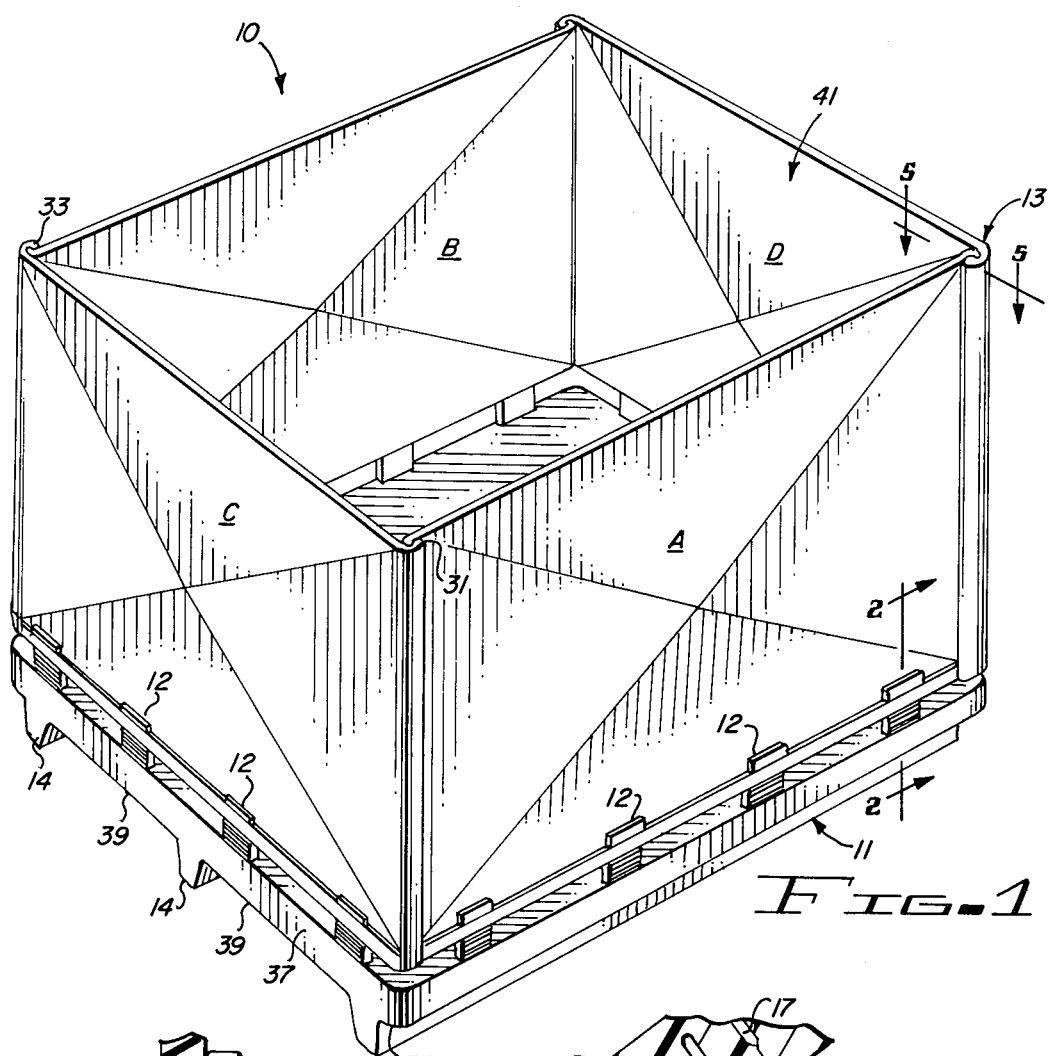
FIG. 1 is a perspective view of a reusable, folding pallet container in its fully assembled and erected form and embodying the invention.
Figures 2, 3, 4:
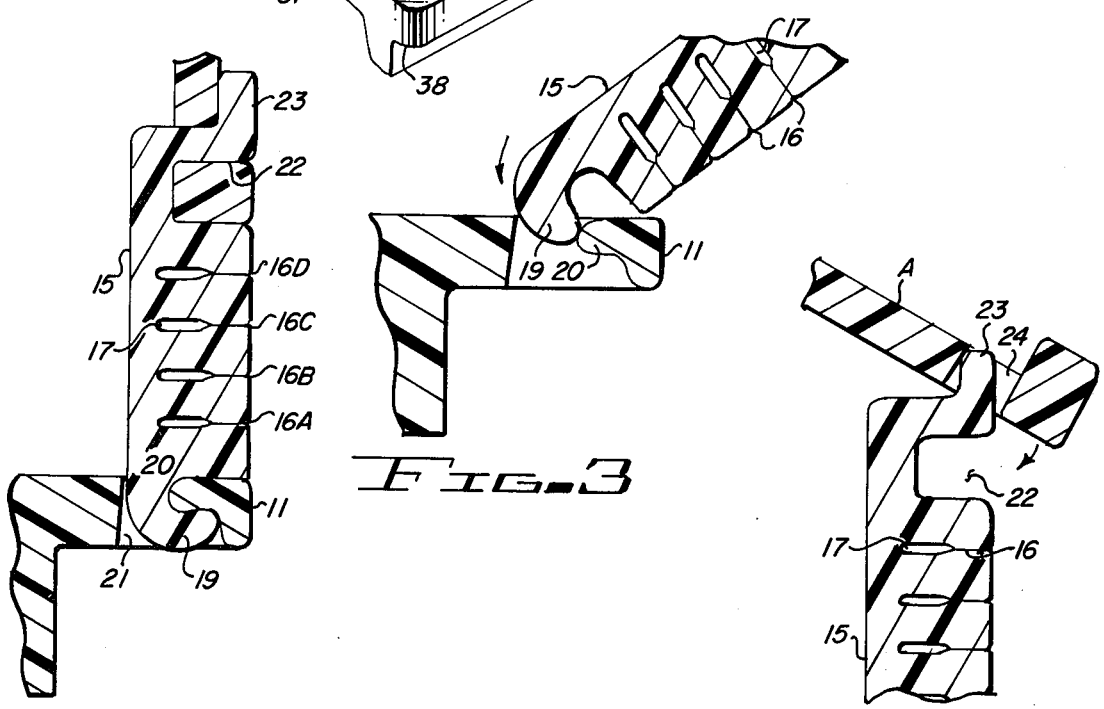
FIG. 2 is a cross-sectional view of FIG. 1 taken along the line 2—2.
FIG. 3 is a partial view of FIG. 2 with parts of the hinge member connected to the base of the container in disengaging relationship.
FIG. 4 is a partial view of FIG. 2 with parts of the hinge member and side of the container shown in engaging position.
Figure 5:
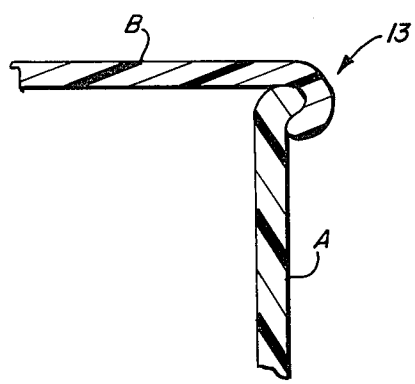
FIG. 5 is a cross-sectional view of FIG. 1 taken along the line 5—5 of one of the upper corners of the erected container illustrating details of the tongue and groove locking means for connecting the panels in rigid vertical relation.

Next, the end panel C which is now detached from its connection with the side panels A and B is pivoted inwardly about groove 16C of its hinge 12 (in the direction of the arrow 3) until its flat inside face rests upon the flat top folded surface of the side panel B with its integral right angled flanges 33 fitting down over the exposed top edges of the folded panels A and B and resting on the top flat surface of the base portion 11.

This precise same action is then repeated for the folding of the other end panel D and it is pivoted inwardly about groove 16D of its hinge 12 (in the direction of the arrow 4) until its flat inside face rests on the flat top folded surface of the end panel C with its integral right-angled flanges 33 fitting down over the right-angled flanges on the previously folded end panel C to thus complete the folding on the container.

Figure 10:
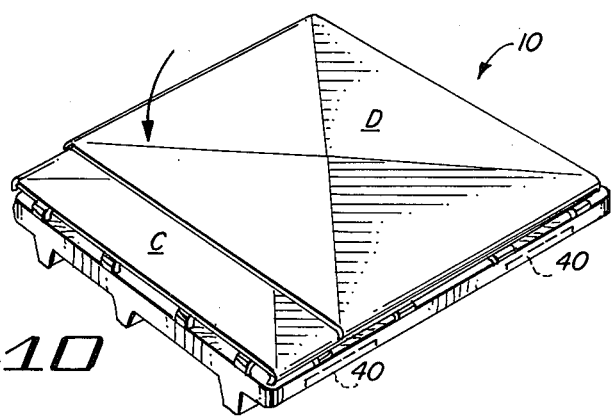

After the container has been folded into a compact form, as shown in FIG. 10, and still attached to its pallet base portion 11, it is evident that a plurality of such folded containers may be stacked one upon another and bound with suitable straps into secure compact piles for return shipment or placed side by side in inexpensive protective cardboard cartons for the same purpose.

Figure 12:
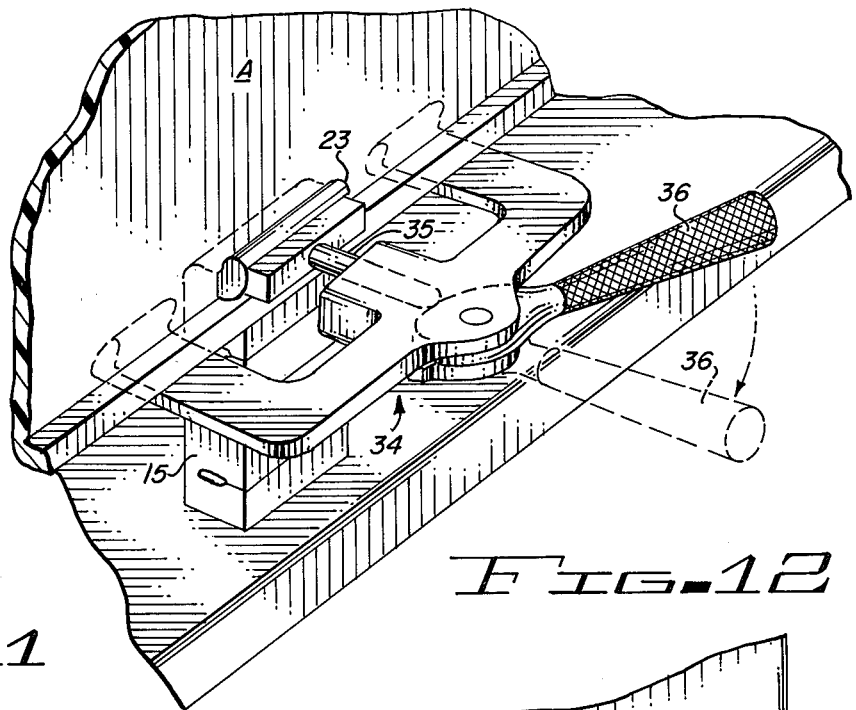
FIG. 12 is a perspective view of hand tool for removing one part of the hinge from one of the walls of the container.

When the folded containers arrive at their source of origin, they may be quickly and easily disassembled into their separate component parts by merely pulling the hinges 12 from their respective openings in the panels and base portion 11. The tool 34 shown in FIG. 12 may be used to grasp the bottom edge of the panel and by means of moveable bolt 35 force the flange 23 out of the opening 22 in the panel by rotation of handle 36 of the tool, as shown in FIG. 12.

The complete dismantling of the container units for purposes of thorough cleaning or sterilization would not be required after each use but only after the units have been used for storing or transporting contaminating or toxic products or especially when they are about to be reused for storing or transporting pharmaceutical products in solid, granular or liquid forms.

The pallet-type base portion 11 is designed and constructed of material having the same or better qualities and characteristics of strength and resistance to corrosive effects of moisture as the associated panel components of the container.

As noted from the drawing, the base portion 11 is provided with longitudinally disposed integral skid portions 14 which depend downwardly from its flat, rectangular platform 37 on the top surface of which the hinged upper panel structure is supported. The skid portions 14 are spaced inwardly from the outer edges of the platform 37 and cut away at their respective ends to provide a flat level non-cintinuous surface 38 which may be utilized for supporting the filled or empty containers on suitable racks or frames. The skid portions are separated from each other a sufficient distance to provide unobstructed longitudinally extending spaces 39 therebetween that are adapted to receive the tines of a lift fork or truck for the purpose of lifting and moving one or a plurality of filled, empty, folded or stacked containers at the same time.

It should be noted that if the pallet-type base portion is to be provided with double entry means for the tines of a lift fork such as the longitudinally extending spaces 39, similar sized transversely extending spaces 40 such as indicated by dash lines in FIG. 10 could be provided by cutting the sides of the platform 37 and the longitudinally disposed skid portions 14 so that the container units could be lifted and moved from either the ends or the sides of the same with a fork lift truck.

Figure 6:
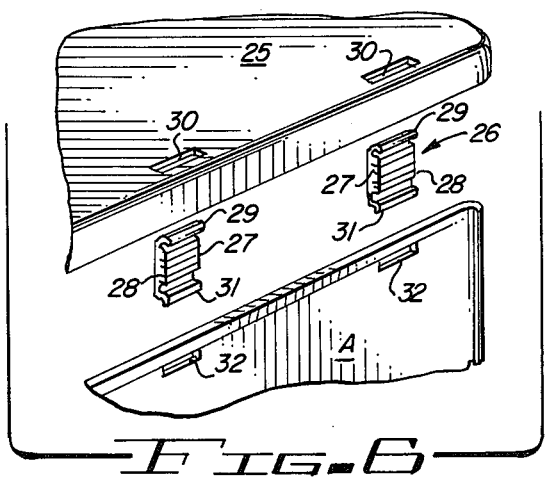
FIG. 6 is a partial perspective view of a lid and its hinging means for the container shown in FIG. 1.

Although covers have been shown in FIG. 6 for the containers which add considerable strength and protection to the containers and the products being stored or transported therein, the pallet-type base portion 11 of each container may act as a cover for a supporting container when stacked one upon the other for shipping so that a cover would only be required for the top unit in each stack.

This means for strengthening and protecting the contents of the stacked containers is made possible by the design of the underside portion of the pallet-type base 11 which is provided with a flat level surface 38 which is sized together with the underside of the rectangular platform 37 and the placement of the outer skids 14 to allow each skid to drop and fit snugly into the top rectangular openings 41 formed by the interconnected wall panels of another juxtapositioned underside surface of platform 37 of a stacked container resting securely on the top continuous edge of its wall panels.

Figure 11:
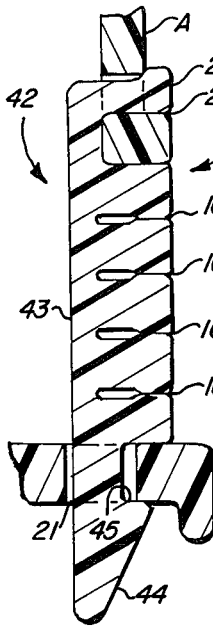
FIG. 11 is an enlarged partial cross-sectional view of a modification of the hinge structure shown in FIGS. 1-6.

FIG. 11 illustrates a modification of the hinge 12 shown in FIGS. 1-4 wherein hinge 42 comprises a strip 43 similar to strip 15 of hinge 12 except that its tapered end 44 is forced through aperture 21 in the base portion 11 of the container and its flange 45 extends over the peripheral edge of aperture 21 to interlock therewith, as shown.

Figure 13:
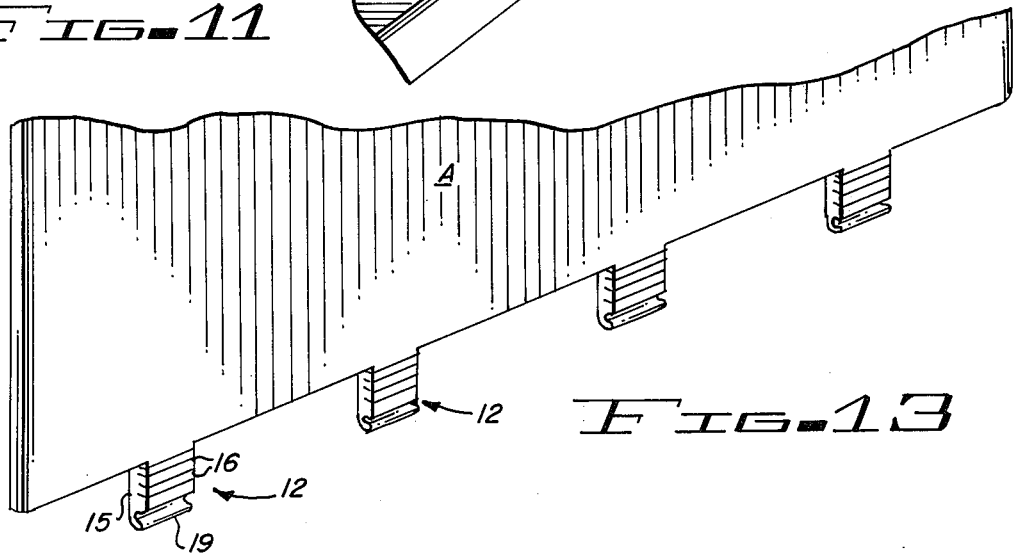
FIG. 13 is a further modification of the panel structure shown in FIGS. 1 and 6 wherein the hinge structure is a molded part of the side panel.
Figure 7:
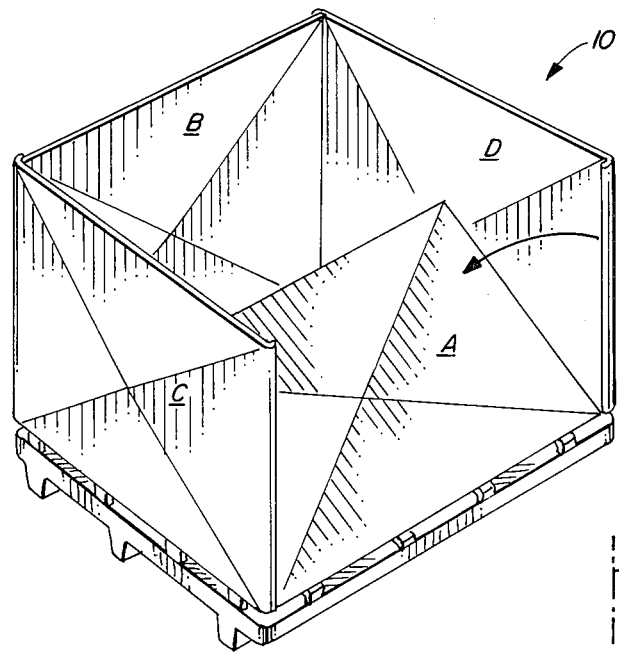
FIGS. 7 through 10 are perspective views of the container illustrating the sequence of operation required for folding the respective side and end panels upon the top surface of the pallet base and upon each other to provide a compact package of the same for return shipment.
Figure 9:
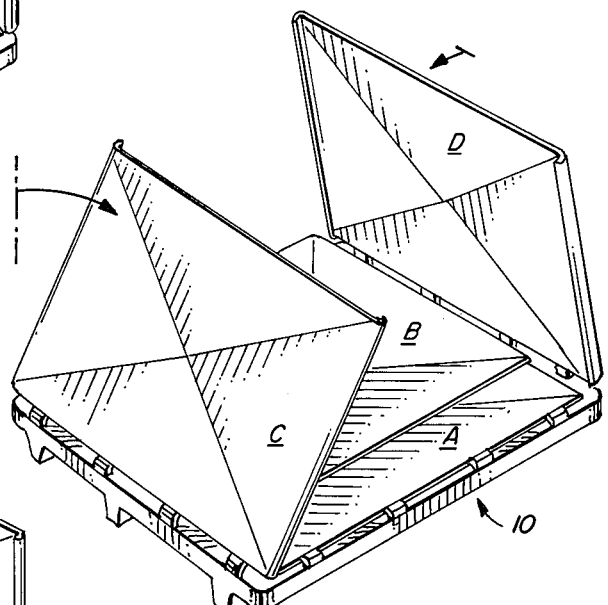
Figure 8:
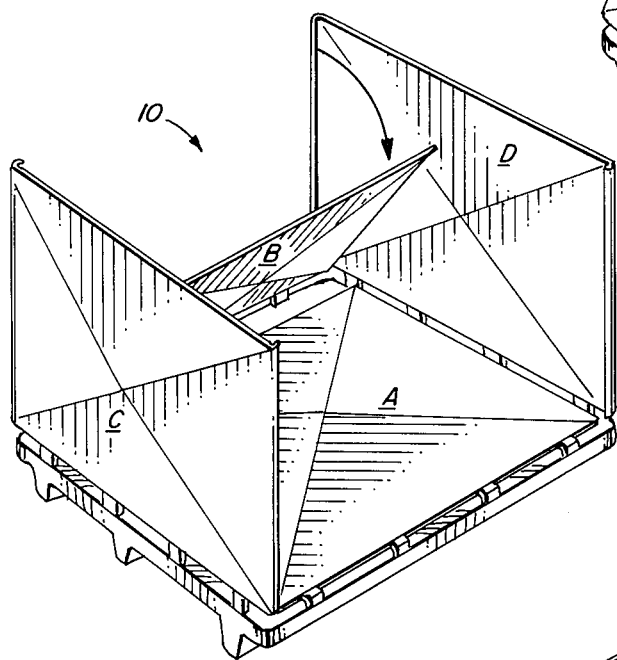

FIG. 13 illustrates a further modification of the hinge 12 shown in FIGS. 1-4 wherein the hinge 46 similar to hinge 12 comprises an integral molded part of the panels A through D.

Figure 14:
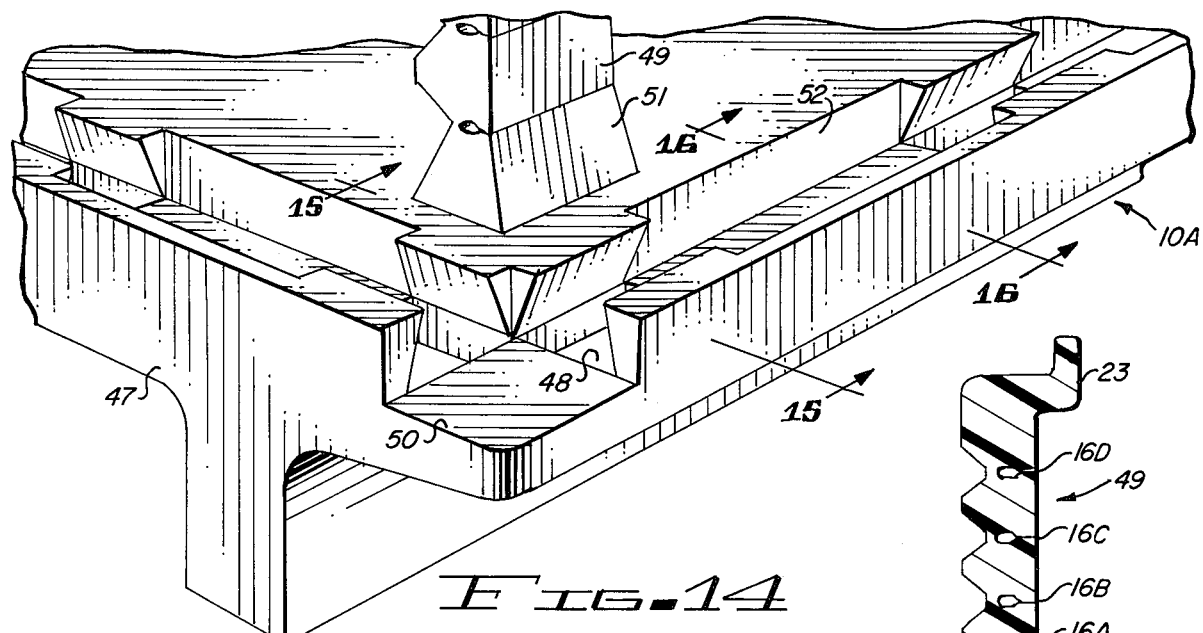
FIG. 14 is a further modification of the pallet container shown in FIG. 1 wherein the hinge structure forming a part of the side walls of the container interlock with the base of the container by sliding into a cooperating part thereof along the pallet base.
Figure 16:
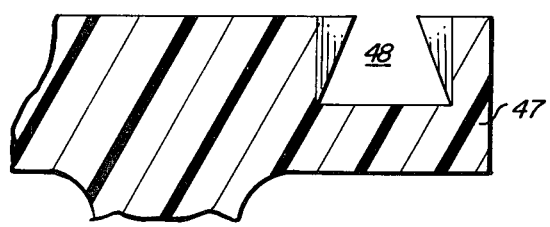
Figure 15:
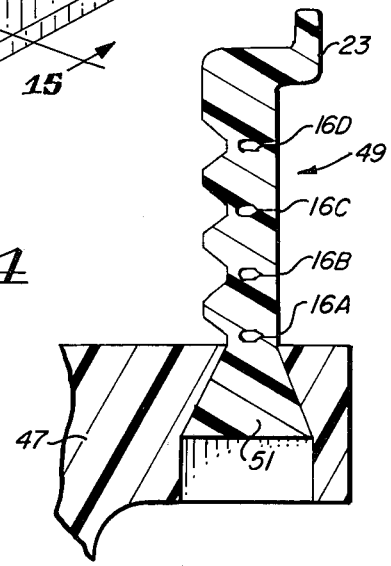
FIG. 15 is a cross-sectional view of FIG. 14 taken along the line 15—15.
Figure 17:
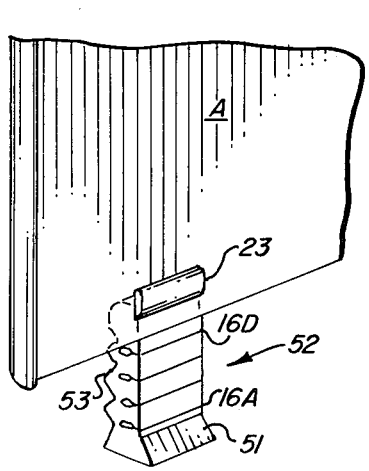

FIGS. 14, 15 and 16 disclose a further modification of container 10 and its hinges 12 wherein the base portion 47 of container 10A is provided with grooves 48 around its peripheral edges for receiving in a sliding fitting arrangement the hinges 49 connecting the panels and base portion together. As shown in FIG. 14, the four corners of the base portion are cutaway portions 50 so that the engaging tapered ends 51 of the hinges may be slid into the grooves from one end or from wider openings 52 of the grooves in a known manner. As shown in FIGS. 15 and 17, hinge 49 is similar to hinge 12 except for its tapered end 51.

Figure 18:
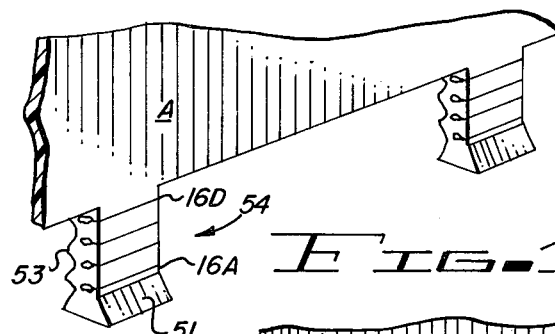
Figure 20:
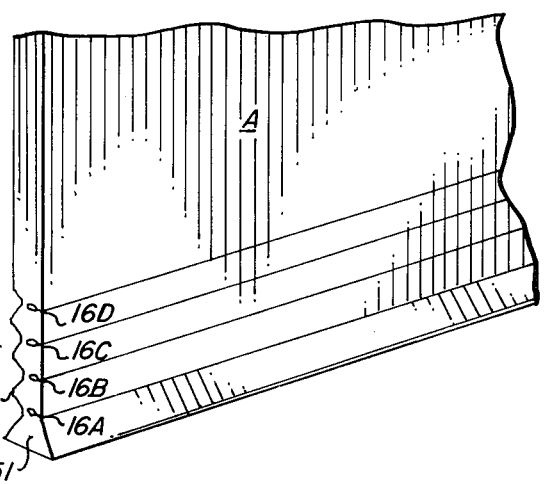

FIGS. 17, 18 and 20 disclose further modifications of the hinge and panel structures shown in FIGS. 1-16. In FIG. 17, hinge 52 is similar to hinge 49 with the same tapered end 51 and flange 23 but has a serrated edge 53 on the opposite side of its groove configuration 16A-16D. FIG. 18 shows a modification of hinge 52 wherein the hinge 54 is formed integral with the panels of the container.

Figure 19:
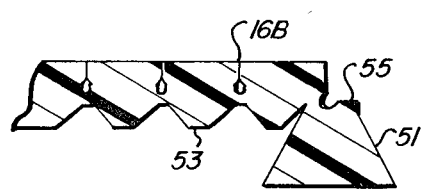

FIG. 19 shows the general hinge configuration shown in FIGS. 17 and 18 showing it in a pivoted position. It should be noted that the edge 55 of the hinge forming a part of its grooves 16 forms a shoulder giving the hinge stability in its longitudinal position and keeps it from bending over in a clockwise position.

FIG. 20 shows a still further modification of the hinge structure shown in FIGS. 17-19 wherein the hinge 56 is formed integral with the full edge of a panel such as panel A.

Thus, it should be noted that a plurality of hinge structures are disclosed which may be formed of metal, plastic or rubber which can be made to pivot at various slotted configurations along its length. In this manner, a common hinge may be used on all sides of the container which will pivot at a desired point along its edge where pressure such as that provided by the edge of a collapsed side of the container is applied.

Although but a few embodiments of the invention have been illustrated and described, it will be apparent to those skilled in the art that various changes and modifications may be made therein without departing from the spirit of the invention or from the scope of the appended claims.

What is claimed is:

1. A collapsible shipping and storage container comprising:
   a four-sided base structure,
   four panel members each mountable on a different edge of said base structure,
   hinge means, one for interconnecting each of said panels to a different edge of said base structure,
   each of said hinge means comprising a resilient member connected at one end to one of said panel members and at the other end to a different edge of said base structure,
   said resilient member being provided with a plurality of spaced slots extending longitudinally of an edge of said base structure outwardly of said container and part way through said resilient member,
   the pivotal axis of each hinge means being arranged along a different slot thereof from a reference point on said base structure to pivot inwardly of the juxtapositioned edge of the base structure over a common surface of it to a position substantially parallel with said surface,
   said pivotal axis of the four hinge means being mounted sequentially each at a greater distance substantially equal to the thickness of the associated panel than the preceeding one from said reference point, and
   fastening means mounted along parallel edges of said panels which are laterally positioned to its hinge means for cooperatively engaging with juxtapositioned edges of adjacent panels when all of said panels are positioned substantially perpendicular to said base structure for holding said panels in container erected position.

2. The collapsible shipping and storage container set forth in claim 1 wherein:
   said resilient member comprises an elongated strip of material.

3. The collapsible shipping and storage container set forth in claim 1 wherein:
   said resilient member comprises a strip of plastic material.

4. The collapsible shipping and storage container set forth in claim 1 wherein:
   said base structure comprises a pallet configuration.

5. The collapsible shipping and storage container set forth in claim 1 wherein:
   said resilient member is detachably connected at different ends to said base structure and one of said panel members.

6. The collapsible shipping and storage container set forth in claim 1 wherein:
   one end of said resilient members is formed integral with one of said panel members.

7. The collapsible shipping and storage container set forth in claim 1 wherein:
   said resilient member extends substantially across the width of said panel members.

8. The collapsible shipping and storage container set forth in claim 1 wherein:
   one end of said resilient member is formed with a hook, and
   said base structure is provided with a groove around its periphery,
   said hook at each of said resilient members engages with an edge of said slot for fastening said resilient member to said base structure.

9. The collapsible shipping and storage container set forth in claim 1 wherein:
   each of said resilient members is provided with four parallelly arranged slots.

10. The collapsible shipping and storage container set forth in claim 1 wherei:
    each of said resilient means is provided with a tapered end for snugly fitting into and interlocking with the peripheral edge of said groove.

11. The collapsible shipping and storage container set forth in claim 1 wherein:
    the ends of the groove at the corners of said base structure are embodied to receive in a sliding movement longitudinally of said slot the resilient members.

* * * * *